Figure 1:
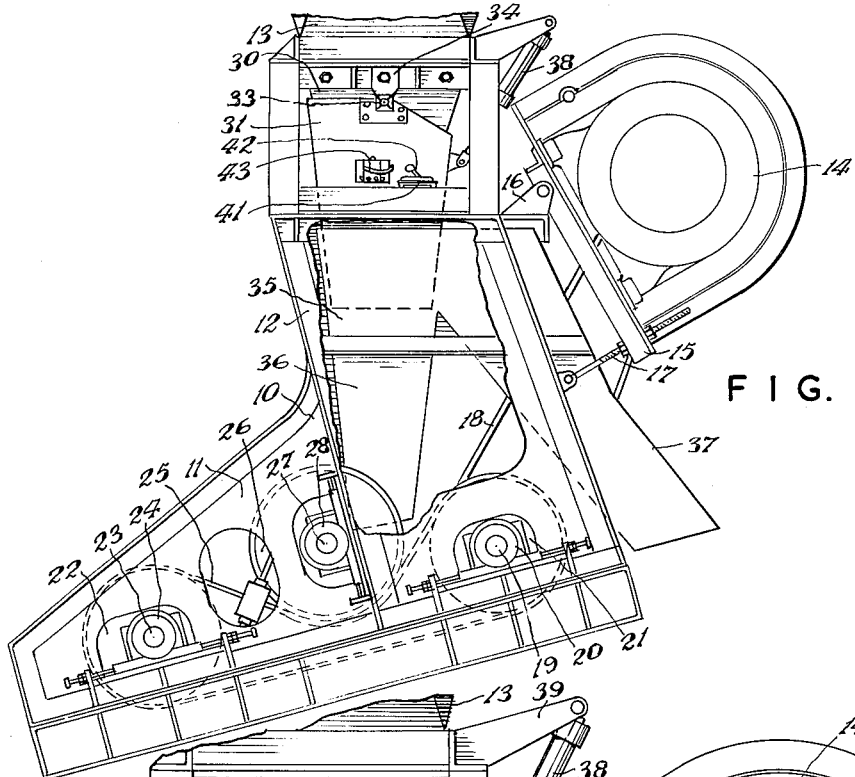

April 11, 1961  S. W. LUCAS  2,979,185
APPARATUS FOR THROWING DISCRETE SUBSTANCES
Filed Oct. 28, 1958

INVENTOR.
SAMUEL WALTER LUCAS
BY
Oberlin, Maky, & Donnelly
ATTORNEYS

2,979,185
APPARATUS FOR THROWING DISCRETE SUBSTANCES

Samuel Walter Lucas, 6 Marlborough St., Sherwood, Brisbane, Queensland, Australia Filed Oct. 28, 1958, Ser. No. 770,209

Claims priority, application Australia Oct. 31, 1957

5 Claims. (Cl. 198—128)

This invention relates to apparatus for throwing discrete substances.

For the purpose of bulk loading discrete substances, such as sugar, it is known to use throwing apparatus which may be lowered into a ship's hold, and receives the sugar from a conduit, the apparatus being capable of throwing the sugar a considerable distance in the desired direction. Such an apparatus, in one form, includes a housing suspended, through a turntable device, from the lower end of a telescopic conduit, sugar flowing down through the conduit being directed, by means of a hinged gate or flap within the housing, to one or other of the arms of a bifurcated chute. One arm of the chute is adapted to direct the sugar to an endless belt mounted within the housing on rollers, one of which is driven at high speed by a motor mounted on the housing, deflector wheels and division discs on a transverse shaft bearing on the belt at the sides and at intermediate positions to ensure that the upper part of the belt is depressed between the main rollers, the division discs, entering the lower part of this arm of the chute, dividing the stream of sugar passing to the belt, which acts to throw the sugar with considerable force through a main outlet at the front of the housing. The other arm of the chute, inclining downwardly to the rear, is adapted to direct sugar directly down into the ship's hold.

Apparatus of this character has been found to be generally very satisfactory, handling sugar or like discrete substances at a very high rate of flow and enabling bulk loading to be effected very rapidly and economically. However, difficulty has been experienced in switching the gate or flap from one position to alternative position during operation of the apparatus, as discrete material such as sugar travelling past the gate or flap, particularly where its sides contact or closely approach the sides of the housing, greatly impede the movement of the gate or flap.

One of the main objects of the present invention is to overcome the said present disadvantage by providing, in such a thrower for sugar or the like, means for directing without difficulty the discrete substances to either of two passages, one leading to a throwing belt, the other leading directly from the thrower housing.

Another object of the invention is to provide means whereby the action of the throwing belt will be discontinued when the sugar or other discrete substance is being directed to the passage leading directly from the housing of the thrower.

According to the present invention, I provide apparatus for throwing discrete substances such as sugar or grain including a frame on the lower part of which front and rear pulleys are rotatably mounted, an endless thrower belt being engaged in these pulleys and depressed at an intermediate position by deflection wheels, a motor being mounted on the frame and adapted to drive one of the pulleys. A guide chute is mounted at the upper part of the frame, and means are provided for delivering discrete substances, such as sugar or grain, gravitationally to the guide chute. A bifurcated delivery chute is mounted on the frame below the guide chute and has a front arm directed down to the depressed intermediate part of the thrower belt, and a rear arm leading downwards from the frame clear of the thrower belt, and a feed transfer chute is provided, having its upper end pivotally connected to the frame and disposed about the lower end of the guide chute, its lower end being within the upper part of the bifurcated delivery chute and being adapted to be moved pivotally into communication with either one of the arms of the bifurcated delivery chute. Means are provided for moving the feed transfer chute pivotally into communication with either the front arm or the rear arm of the bifurcated delivery chute, and preferably associated means are provided for automatically stopping the motor when the feed transfer chute is moved into communication with the rear arm thereof.

Figure 2:
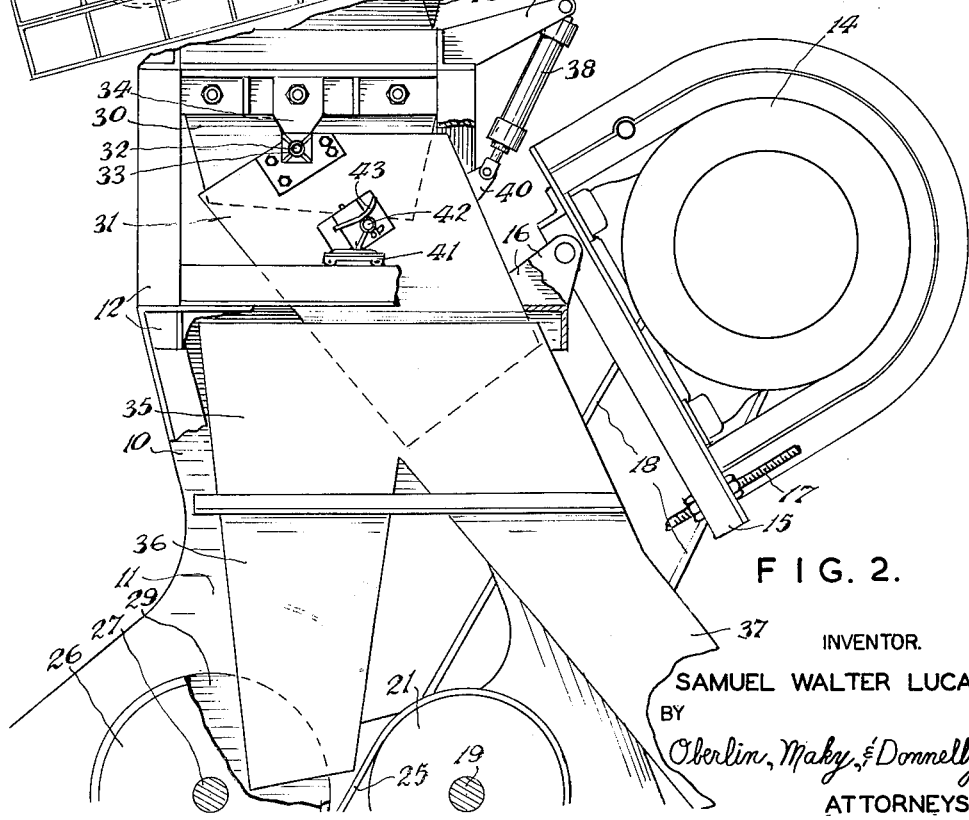

In the drawings:

Fig. 1 is a partly broken-away side elevational view of a throwing apparatus for sugar or the like according to the invention, the feed transfer chute being in such position as to direct the sugar or the like to the throwing belt, and Fig. 2 is a broken-away side elevational view, to enlarged scale, of part of the apparatus shown in Fig. 1, the feed transfer chute being moved to alternative position.

The throwing apparatus shown in the drawings includes a housing 10 built up of sheet metal plates 11 mounted upon a sturdy main frame 12 of angle irons and other members welded together.

Into the open top of the main frame 12 there leads a lower conduit 13, which is shaped to develop downwardly from round to square cross-section, the upper part of this lower conduit 13, not shown in the drawings, being adapted to be connected in well-known manner, through a turn-table device, to the lower end of a telescopic substantially vertical conduit for sugar or the like.

At the rear of the housing 10 an electric motor 14 is mounted upon a motor mounting frame 15, which is pivoted to a pair of pivot brackets 16 secured to the rear of the main frame 12, the inclination of the motor mounting frame being adjustable by means of a pair of screw-threaded adjusting devices 17. Through a belt 18 the motor 14 drives a pulley (not shown) of a transverse shaft 19 mounted in longitudinally adjustable bearings 20 and carrying a drive roller 21. A front roller 22, similar to the drive roller, is mounted upon a shaft 23, carried in longitudinally adjustable bearings 24 and parallel to shaft 19. An endless thrower belt 25, of well-known type, is mounted upon the said rollers, and its upper part is depressed between the drive roller and the front roller by a pair of deflector wheels 26 mounted upon a transverse shaft 27 rotatable in vertically adjustable bearings 28, these deflector wheels bearing upon the side portions of the thrower belt. A pair of division discs 29, of similar diameter to the deflector wheels and mounted upon the same shaft, bear upon the thrower belt at positions intermediate the deflector wheels.

The lower end of the lower conduit 13 leads into a fairly short fixed guide chute 30 secured within the upper part of the housing 10. The front and rear of this chute, which is rectangular in cross-section, are downwardly convergent.

The lower part of the fixed guide chute is located within the upper part of a pivoted feed transfer chute 31, which is substantially rectangular in cross-section, its front and rear being downwardly convergent. This feed transfer chute is suspended pivotally from a pair of trunnions 32 extending outwardly from either side of the upper part of the said chute, and rotatably mounted in bearings 33 associated with bearing brackets 34 secured to and extending downwardly from the upper part of the main frame 10.

The lower end of the pivoted feed transfer chute 31 is located within the rectangular-section upper part of a delivery chute 35 which, below this upper portion, is bifurcated, one arm 36 extending downwardly, its front and back being somewhat convergent, the other arm 37 inclining rearwardly and downwardly, its open lower end being to the rear of the lower part of the housing 10. The front arm 36 of the bifurcated delivery chute 35 is adapted to deliver sugar or the like to the thrower belt 25, and its lower front part is slotted to permit this front arm to sit over the division discs 29, the deflector wheels 26 being located to either side of the said front arm 36.

Normally, the pivoted feed transfer chute 31 hangs downwardly, as shown in Fig. 1, leading directly into front arm 36 of the bifurcated delivery chute 35; but it may be swung pivotally to the rear, to the position shown in Fig. 2, its lower end just clearing the junction of the two arms of the delivery chute, the feed transfer chute then leading directly into the rear arm 37 of the delivery chute.

To move the pivoted feed transfer chute 31 from normal to alternative position and vice versa, a pneumatic or hydraulic ram 38 is connected between a bracket 39 extending from the rear of the top of the housing main frame 12, and a bracket 40 extending from the rear of the pivoted feed transfer chute 30. Suitable pneumatic or hydraulic means are provided for operating the ram to move the pivoted feed transfer chute 31 from normal position, as shown in Fig. 1, to alternative position, as shown in Fig. 2, and vice versa.

In the circuit of the electric motor 14 there is connected a switch 41, mounted upon one side of the main frame 12 of the housing 10. This switch may be opened or closed by movement of a switch arm 42, and to move this switch arm there is provided a switch actuating shoe 43, mounted in adjustable manner upon a side of the pivoted feed transfer chute 31. When the said feed transfer chute 31 is moved from normal to alternative position, the switch actuating shoe 43 contacts the switch arm 42 and moves it to open the switch so that the operation of the motor 14 is interrupted. When the feed transfer chute is moved back to normal position, the switch is permitted to close to bring the motor into operation again.

In use, the housing 10 is lowered into a ship's hold and sugar, grain or other discrete substance is caused to flow gravitationally down the telescopic conduit into the lower conduit 13, passing thence through the fixed guide chute 30 and through the pivoted feed transfer chute 31 to the delivery chute 35. Assuming that the pivoted feed transfer chute 31 is in normal position, as shown in Fig. 1, the sugar or the like is directed into the front arm 36 of the delivery chute, and thence onto the rapidly moving thrower belt 25, which causes the discrete material to be ejected at high speed from the open front part of the housing 10; and by causing the housing 10 to be raised or lowered and rotated by well known means provided, the sugar or the like may be directed in a stream towards any of the bulkheads of a ship's hold. When it is desired to direct the flow of sugar or the like more or less downwardly, the ram 38 is operated to move the pivoted feed transfer chute 31 to alternative position, as shown in Fig. 2; and at the same time the switch 41 is operated by the actuating shoe 43 to disconnect the electric motor 14. The sugar or the like then passes from the pivoted feed transfer chute 31 to the rear arm 37 of the delivery chute 35 and flows more or less directly downwardly therefrom. In this manner, sugar, grain or other discrete material may be very rapidly bulk-loaded into a ship's hold, which may at the same time be correctly trimmed. The transfer of the feed of the sugar or the like from one arm to the other of the bifurcated delivery chute may be effected rapidly and without difficulty, and during such time as the thrower belt is not required the motor 14 is switched off, so that wear of moving parts is materially reduced, as also is the cost of operation of the apparatus.

Although throwing apparatus for discrete substances such as sugar or grain, made in accordance with the preferred embodiment of the invention herein described and illustrated, will be found to be very effective in achieving the objects for which the invention has been devised, it will be understood, of course, that many minor modifications of constructional detail and design, which will be readily understood by persons skilled in the art, may be made within the spirit and scope of the invention as defined by the appended claims.

I claim:

1. Apparatus for throwing discrete substances including a frame; an endless thrower belt mounted on pulleys rotatably mounted on the frame; an electric motor mounted on the frame and adapted to drive one of the pulleys; a guide chute mounted on the frame; means for delivering discrete substances gravitationally to the guide chute; a bifurcated delivery chute mounted on the frame below the guide chute and having a front arm directed down to the thrower belt and a rear arm leading downwards from the frame clear of the thrower belt; a feed transfer chute, its upper end pivotally connected to the frame and disposed about the lower end of the guide chute, the pivoted feed transfer chute having its lower end within the upper part of the bifurcated delivery chute and being adapted to be moved pivotally into communication with either one of the arms of the bifurcated delivery chute; means for moving the feed transfer chute pivotally into communication with either the front arm or the rear arm of the bifurcated delivery chute, a switch connected in the circuit of the motor and mounted on the frame, and a switch actuator on the feed transfer chute adapted automatically to open the switch when the feed transfer chute is moved into communication with the rear arm of the delivery chute, and to permit the switch automatically to close when the feed transfer chute is moved into communication with the front arm of the feed delivery chute.

2. Loading and trimming apparatus adapted selectively to discharge discrete substances laterally or substantially directly below the apparatus wherein alternation between such directional discharges is easily accomplished, including: a portable frame, and endless thrower-belt means on said frame, means carried by the frame to operate the thrower-belt means, a bifurcated chute on the frame having one arm disposed to discharge onto such thrower-belt means and a second arm disposed to discharge substantially downwardly of the frame, a feed chute pivotally carried by the frame to discharge selectively into said one arm, whereby the thrower-belt means ejects the discrete substances laterally of the frame, and into said second arm, whereby such substances are deposited substantially below the frame to provide a trimming action, said feed chute having a cross-sectional area providing substantially a continuation of the cross-sectional area of each of said arms.

3. Loading and trimming apparatus adapted selectively to discharge discrete substances laterally or substantially directly below the apparatus wherein alternation between such directional discharges is easily accomplished, including: a portable frame, an endless thrower-belt trained about pulleys rotatably mounted on the frame, means carried by the frame to operate the thrower-belt, a bifurcated chute on the frame having one arm disposed to discharge onto such thrower-belt and a second arm disposed to discharge substantially downwardly of the frame, a feed chute disposed at least partially within the bifurcated chute and pivotally carried by the frame for reciprocation between the arms of the bifurcated chute to discharge selectively into said one arm, whereby the thrower-belt ejects the discrete substances laterally of the frame, and into said second arm, whereby such substances are deposited substantially directly below the frame to provide a trimming action, said feed chute being of a diminishing cross-sectional area and providing substantially a continuation of the cross-sectional area of each of said arms, and means responsive to such reciprocation of the feed chute selectively to energize said thrower-belt operating means.

4. Loading and trimming apparatus adapted selectively to discharge sugar, grain, and other like discrete substances either laterally or substantially directly below the apparatus wherein alternation between such directional discharges is easily accomplished, including: a portable frame adapted for positioning within a container to receive such discrete substances, an endless thrower-belt trained about pulleys rotatably mounted on the frame, motor means on the frame to drive one of the pulleys, a guide chute on the frame to receive such discrete substances, a bifurcated chute disposed on said frame below the guide chute and having one arm of generally diminishing cross-sectional area disposed to discharge onto the thrower-belt and a second arm of generally diminishing cross-sectional area to discharge substantially downwardly of the frame, a feed chute pivotally carried by the frame intermediate said guide and bifurcated chutes for reciprocation between the arms of the bifurcated chute in a manner to just clear the junction of said arms and to discharge selectively into said one arm, whereby the thrower-belt ejects the discrete substances laterally of the frame, and into said second arm, whereby such substances are deposited substantially directly below the frame to provide a trimming action, said feed chute externally telescoping the guide chute and internally telescoping the bifurcated chute and having a diminishing cross-sectional area while providing substantially a continuation of the cross-sectional area of each of said arms when positioned thereover, means to pivot said feed chute, and cooperating switch means carried by the frame and the pivoted feed chute responsive to such reciprocation of the feed chute selectively to energize said motor means.

5. Bulk loading and trimming apparatus adapted selectively to discharge sugar, grain, and other like discrete substances either laterally or substantially directly below the apparatus wherein alternation between such directional discharges is easily accomplished, including: a portable frame adapted for positioning within a container to receive such discrete substances, and endless thrower-belt trained about pulleys rotatably mounted on the frame, motor means on the frame to drive one of the pulleys, a guide chute on the frame to receive such discrete substances, a bifurcated chute disposed on said frame below the guide chute and having one arm of generally diminishing cross-sectional area in substantial vertical alignment with said guide chute to discharge onto the thrower-belt and a second arm of generally diminishing cross-sectional area extending angularly of the frame to a point clear of the apparatus to discharge substantially downwardly of the frame, a feed chute pivotally mounted on the frame intermediate said guide and bifurcated chutes, the upper end of said feed chute telescopically receiving said guide chute, the lower end of said feed chute being disposed within said bifurcated chute and adapted by such pivotal mounting for reciprocation between the arms of the bifurcated chute in a manner to just clear the junction of said arms and to discharge selectively into said one arm, whereby the thrower-belt ejects the discrete substances laterally of the frame, and into said second arm, whereby such substances are deposited substantially directly below the frame to provide a trimming action, said feed chute being of a diminishing cross-sectional area and providing substantially a continuation of the cross-sectional area of each of said arms when positioned thereover, means on the frame to pivot said feed chute, and cooperating switch means carried by the frame and the pivoted feed chute responsive to such reciprocation of the feed chute selectively to energize said motor means when the feed chute communicates with said one arm of the bifurcated chute and to de-energize said motor means when the feed chute communicates with said second arm.

References Cited in the file of this patent

UNITED STATES PATENTS

| | | |
|---|---|---|
| 2,658,610 | Winslow | Nov. 10, 1953 |
| 2,687,798 | Landrey | Aug. 31, 1954 |
| 2,699,891 | Kellicott | Jan. 18, 1955 |